US010365172B2

(12) United States Patent
Tomita et al.

(10) Patent No.: US 10,365,172 B2
(45) Date of Patent: Jul. 30, 2019

(54) TACTILE SENSOR THAT INCLUDES TWO SHEETS EACH HAVING AT LEAST EITHER FLEXIBILITY OR ELASTICITY

(71) Applicant: Panasonic Intellectual Property Management Co., Ltd., Osaka (JP)

(72) Inventors: Yoshihiro Tomita, Osaka (JP); Koichi Hirano, Osaka (JP); Susumu Sawada, Osaka (JP); Hideki Ohmae, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/981,676

(22) Filed: May 16, 2018

(65) Prior Publication Data

US 2018/0356301 A1 Dec. 13, 2018

(30) Foreign Application Priority Data

Jun. 9, 2017 (JP) .................................. 2017-114770

(51) Int. Cl.
*G01L 1/00* (2006.01)
*G01L 1/14* (2006.01)
*B25J 13/08* (2006.01)

(52) U.S. Cl.
CPC .............. *G01L 1/146* (2013.01); *B25J 13/084* (2013.01); *Y10S 901/46* (2013.01)

(58) Field of Classification Search
CPC ........ G01L 1/146; B25J 13/084; Y10S 901/46
USPC .................................................... 73/862.046
See application file for complete search history.

(56) References Cited

U.S. PATENT DOCUMENTS

| 5,666,008 A * | 9/1997 | Tomita ................... H01L 21/563 257/678 |
| 2009/0065933 A1* | 3/2009 | Takehara ................ H01L 24/11 257/737 |
| 2011/0205180 A1* | 8/2011 | Han ....................... G06F 3/0412 345/174 |
| 2012/0182254 A1* | 7/2012 | Jang ..................... G06F 3/03545 345/174 |
| 2018/0348933 A1* | 12/2018 | Jun ........................ G06F 3/0412 |

FOREIGN PATENT DOCUMENTS

| JP | 60-016393 | 1/1985 |
| JP | 60-114493 | 6/1985 |
| JP | 1-295791 | 11/1989 |
| JP | 1-316194 | 12/1989 |

(Continued)

*Primary Examiner* — Max H Noori
(74) *Attorney, Agent, or Firm* — McDermott Will & Emery LLP

(57) ABSTRACT

A tactile sensor includes: a first sheet having at least either flexibility or elasticity; and a second sheet having at least either flexibility or elasticity and having a first surface facing the first sheet and a second surface opposite to the first surface. The second surface includes a plurality of protruding shapes. Each of the plurality of protruding shapes includes an enclosed space inside, the enclosed space being defined by the first surface of the second sheet and the first sheet. At least one first electrode pattern is disposed on the first sheet in the enclosed space of each of the plurality of protruding shapes. At least one second electrode pattern is disposed on the first surface in the enclosed space of each of the plurality of protruding shapes.

14 Claims, 8 Drawing Sheets

(56) References Cited

FOREIGN PATENT DOCUMENTS

| JP | 2006-112843 | 4/2006 |
|----|-------------|--------|
| JP | 2011-237288 | 11/2011 |
| JP | 2012-141255 | 7/2012 |
| JP | 2014-142193 | 8/2014 |

* cited by examiner

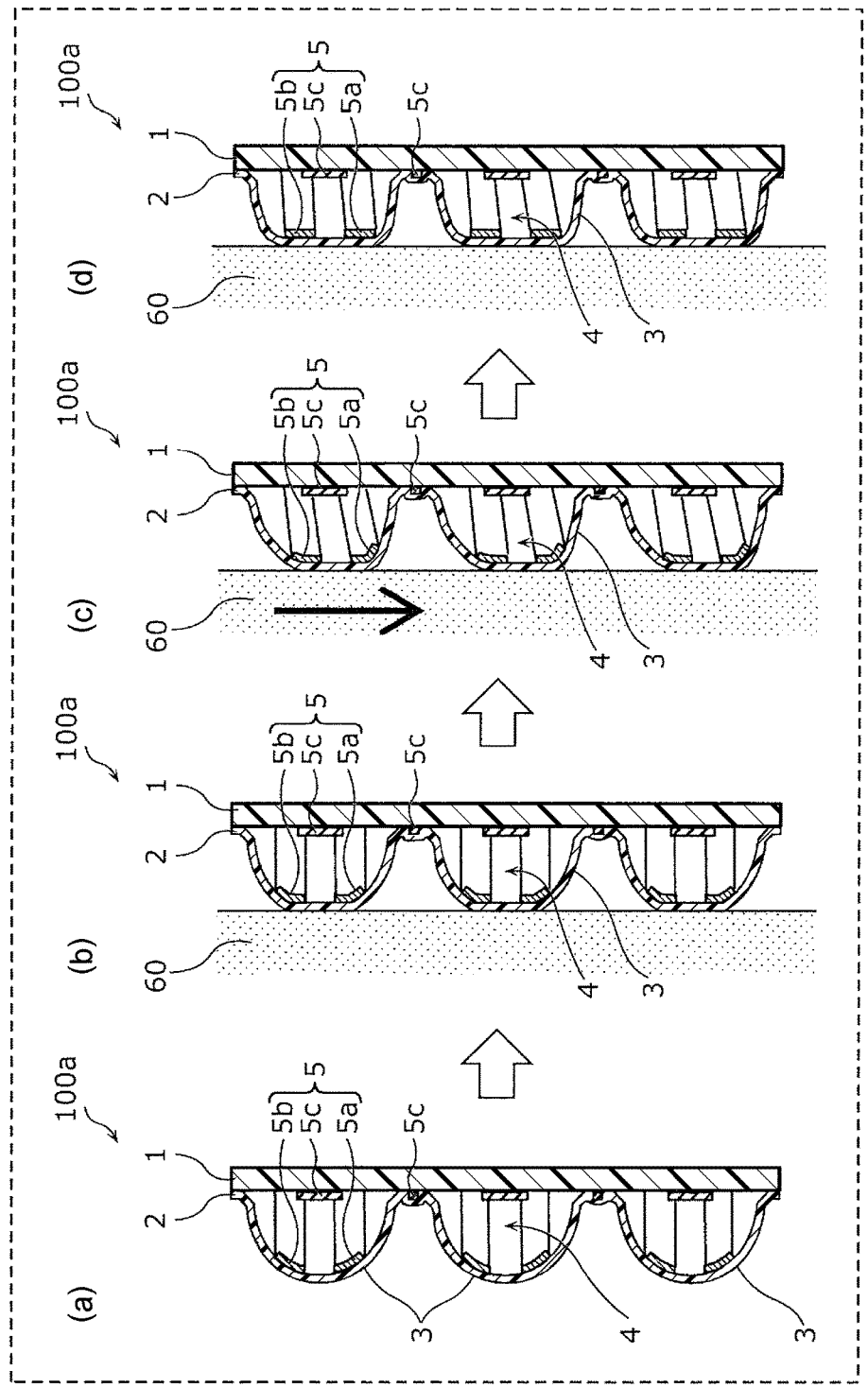

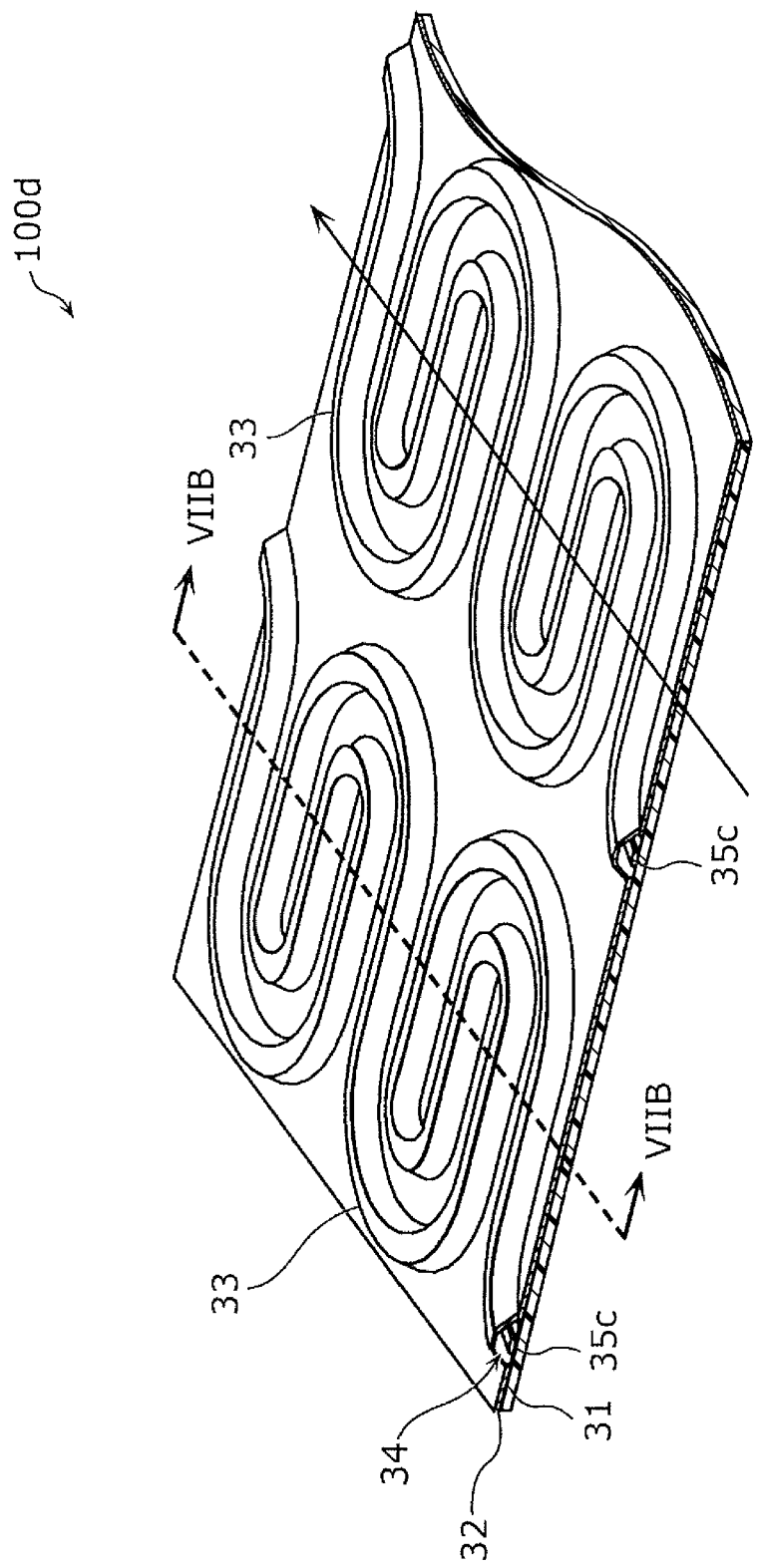

TACTILE SENSOR THAT INCLUDES TWO SHEETS EACH HAVING AT LEAST EITHER FLEXIBILITY OR ELASTICITY

BACKGROUND

1. Technical Field

The present disclosure relates to a tactile sensor that acquires tactile information, a method for manufacturing a tactile sensor, and a method of sensing with a tactile sensor.

2. Description of the Related Art

Conventionally, sensors for grasping objects having given shapes and hardness, e.g., automobile assembly parts and the like, have been under development for use in industrial robots.

As a sensor for controlling the grip force of an industrial robot, a contact sensor of Japanese Unexamined Patent Application Publication No. 60-16393 is known. The contact sensor of Japanese Unexamined Patent Application Publication No. 60-16393 includes an airtight saclike gripper made of a flexible material and filled with a liquid pressure transmission fluid and a pressure detector and detects contact between the gripper and an object by measuring a change in pressure of the fluid with the pressure detector. Further, Japanese Unexamined Patent Application Publication No. 60-114493 discloses a robot-hand tactile sensor including a large number of electrodes, pressure-sensitive conductive rubber, a common electrode, and an attaching portion.

As an example of a sensor that detects a shearing stress, Japanese Unexamined Patent Application Publication No. 1-295791 discloses a force detecting position displacing device that is utilized in a robot force sensor or the like. Further, as an example of a sensor that detects sliding friction, a slide detecting device of Japanese Unexamined Patent Application Publication No. 1-316194 is known. The detecting device of Japanese Unexamined Patent Application Publication No. 1-316194 includes a pressure sensor and a contact maker having a bulging portion and, by coupling together the pressure sensor and the contact maker, transmits, to the pressure sensor, a shear vibration that the bulging portion produces with an object.

Further, along with the recent advancement of robotics technology, sensors for use in service robots that provide some kind of service to humans have been under development. Examples of such service robots include robots that support the work of humans, cooperative robots that cooperate with humans to support the work of humans, and similar robots.

As an example of a service-robot tactile sensor, Japanese Unexamined Patent Application Publication No. 2011-237288 discloses a capacitive sensor having electrodes provided on the front side and the back side of a dielectric composed of a plurality of dielectric layers differing in spring constant from each other in the direction they are stacked. Further, Japanese Unexamined Patent Application Publication No. 2012-141255 discloses a tactile sensor including an elastic film that is able to be elastically deformed by contact with an object, an ultrasonic reflector that moves from one position to another according to the deformation of the elastic film, an ultrasonic element that emits ultrasonic waves and receives reflected ultrasonic waves, and a control section that controls the ultrasonic element.

SUMMARY

One non-limiting and exemplary embodiment provides a tactile sensor that makes it possible to detect not only a pressing force but also a shearing stress or sliding friction on an object.

In one general aspect, the techniques disclosed here feature a tactile sensor including: a first sheet having at least either flexibility or elasticity; and a second sheet having at least either flexibility or elasticity and having a first surface facing the first sheet and a second surface opposite to the first surface. The second surface includes a plurality of protruding shapes. Each of the plurality of protruding shapes has an enclosed space inside. The enclosed space is defined by the first surface of the second sheet and the first sheet. At least one first electrode pattern is disposed on the first sheet in the enclosed space of each of the plurality of protruding shapes. At least one second electrode pattern is disposed on the first surface in the enclosed space of each of the plurality of protruding shapes. In the enclosed space of each of the plurality of protruding shapes, the at least one first electrode pattern includes a plurality of first electrode patterns and/or the at least one second electrode pattern includes a plurality of second electrode patterns.

The tactile sensor of the present disclosure makes it possible to detect not only a pressing force but also a shearing stress or sliding friction on an object.

It should be noted that general or specific embodiments may be implemented as a sensor, a device, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates cross-sectional views schematically showing how the tactile sensor according to Embodiment 1 operates;

FIG. 7A is a top view schematically showing a configuration of a tactile sensor according to Embodiment 3.

DETAILED DESCRIPTION

Figure 1:
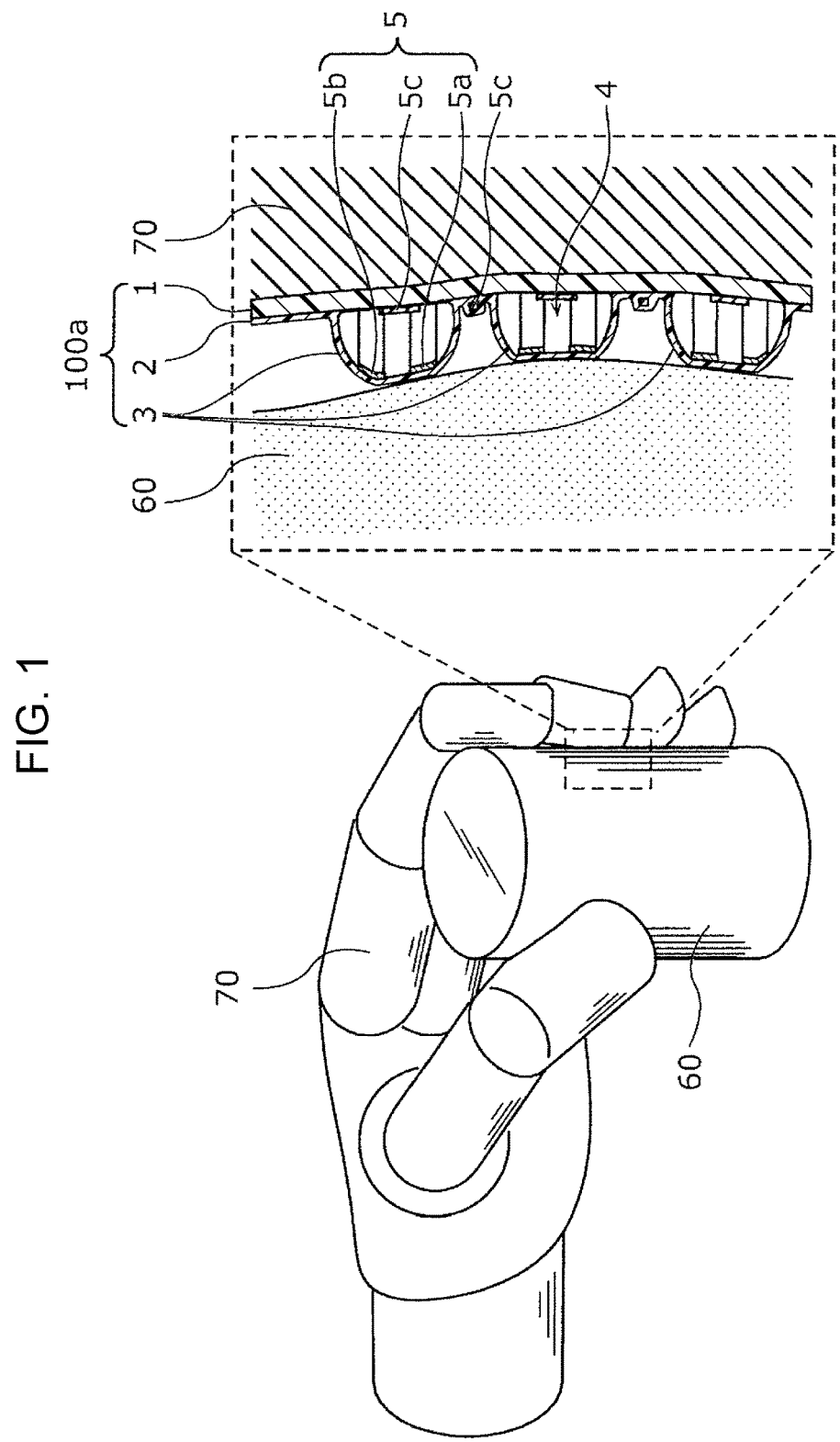
FIG. 1 is an explanatory diagram schematically showing a configuration of a tactile sensor according to Embodiment 1.

Underlying Knowledge Forming Basis of the Present Disclosure

First, the early-stage idea that led the inventors to contrive a tactile sensor of the present disclosure is described.

Conventionally, robots have been used mainly in industry. However, along with the recent advancement of robotics technology, robotics devices have been deployed to various scenes. Examples of such robotics devices include: robots such as remote-controlled manipulators or robot hands that support the work of humans, cooperative robots that cooperate with humans to support the work of humans, assist suits and electric prosthetic arms and legs that complement the functions or capabilities of humans, home-care robots that coexist in human life to conduct work, and similar robots.

In order, for example, to accomplish work as humans do in these scenes, it is necessary to grasp objects of various forms and materials without trouble. Further, the grasp needs to be controlled by sensing that comes close to the tactility of a human hand. Further, while robotics devices are acting in cooperation with humans, it is necessary to control subtle force adjustments in accordance with humans and take care not to hurt humans. Therefore, tactile sensing is important again here.

For use, for example, in controlling the force with which a robot grasps an object, tactile sensors that detect the grip force have been disclosed since long ago. For example, a tactile sensor disclosed in Japanese Unexamined Patent Application Publication No. 60-16393 grasps an object with a boxlike gripper filled with a fluid, deforms the boxlike gripper with grip force to press the fluid, measures the fluid with a pressure detector, and thereby gives information on the grip force. Further, the tactile sensor disclosed in Japanese Unexamined Patent Application Publication No. 60-114493 can measure a planarly-multipoint pressure distribution with the pressure-sensitive conductive rubber sandwiched between a base film formed with a matrix of wiring patterns and a cover film.

Whether in Japanese Unexamined Patent Application Publication No. 60-16393 or Japanese Unexamined Patent Application Publication No. 60-114493, the conventional tactile sensor has only made it possible to obtain information on pressure such as grip force. Robotics devices such as industrial robots that are used in work under some restrictions on the shapes and materials of objects can be controlled simply by acquiring information on grip force. However, assuming robotics devices that cooperate or coexist with humans, objects may be not only hard objects such as mechanical parts or electronic parts but also various objects that are used in the work or living environment of humans. For example, the shapes of objects vary from large shapes to small shapes. Further, the materials of objects vary among soft and fragile materials such as foods, materials such as glass that break when strongly grasped, and materials that slip off when weakly grasped. For that reason, robotics devices that cooperate or coexist with humans need to be controlled in accordance with objects they grasp. This cannot be attained simply by detecting grip force.

It is therefore important for a robotics device that touches and grasps various objects to detect the surface condition of a tactile sensor in conformance with various shapes such as asperities on the surfaces of objects and detect a shearing stress or sliding friction in a rubbing direction with respect to the surface of an object.

As an example of a conventional method for detecting a shearing stress, Japanese Unexamined Patent Application Publication No. 1-295791 discloses a positioning device composed of an integrated combination of force detection and an actuator. This device is configured to have a rod-like force transmission body standing in the center of a disc-like structure. In a case where an X, Y, and Z triaxial stress is applied to the tip of this rod-like force transmission body, the disc-like structure becomes strained due to the stress thus applied. By detecting the strain with strain sensors placed in an X direction and a Y direction on the circumference of the disc, information on a Z-direction stress and an X-Y plane shearing stress is acquired. There are a large number of examples of sensors that detect a triaxial stress including a shearing stress as in this example. In this example, a stress applied to an extremely small part such as the tip of the rod-like force transmission body is detected. For that reason, a robotics device including the sensor applies locally-increased pressure to an object in grasping the object and may therefore cause damage to the object. Further, with a small area of contact, the object may not be able to be grasped. Further, since the sensor is a complex structure, it is high in manufacturing cost and difficult to install in a limited space such as a fingertip of a robot hand.

The slide detecting device disclosed in Japanese Unexamined Patent Application Publication No. 1-316194 is an example of a sliding friction sensor in which the bulging portion, which touches an object, vibrates due to sliding friction with the object and the vibration is transmitted to the pressure sensor for detection. It is only frictional oscillation that can be detected by this slide detecting device. However, it is necessary for a robotics device such as a robot hand to be able to acquire information not only on sliding frictional oscillation but also on a stress or the like for finding a sliding direction. Unless these pieces of information can be acquired, feedback to appropriate control is difficult. Further, such a complex structure as this case example in which the bulging portion, the pressure sensor, and a vibration transmitter are separate is high in manufacturing cost and difficult to install in a limited space such as a fingertip of a robot hand.

As noted above, it cannot be said that a sensor has been achieved which can adapt to subtle control in a robotics device or the like that cooperates or coexists with humans, i.e., which can detect not only a pressing force but also a shearing stress or sliding friction on an object.

The inventors diligently studied to solve the foregoing problems. As a result, the inventors conceived of a tactile sensor of the present disclosure. An example of the tactile sensor of the present disclosure includes an elastomer sheet and a base sheet. The elastomer sheet makes contact with an object. The elastomer sheet is formed with a plurality of protrusions having convex shapes having a predetermined width. Enclosed spaces are formed inside the protrusions by fixedly bonding the elastomer sheet and the base sheet at the part surrounding the convex shapes. The tactile sensor of the present disclosure senses a deformed state of the plurality of protrusions in contact with an object. This makes it possible not only to detect pressure applied to the plurality of protrusions from the object but also to detect a deformation resulting from a shearing stress, frictional oscillation resulting from sliding friction, or the like. Furthermore, the tactile sensor can be formed into a sheet shape with a simple configuration of an elastomer sheet provided with protrusions, a base sheet, and a sensing section that senses a deformed state of the protrusions. For that reason, the tactile sensor of the present disclosure can be easily fitted, for example, into a limited space such as a fingertip of a robot hand or onto a curved surface or the like. Further, since the tactile sensor of the present disclosure is simple in configuration, it can be manufactured at low cost.

The present disclosure relates to a tactile sensor that acquires tactile information, a method for manufacturing a tactile sensor, and a method of sensing with a tactile sensor that make it possible to detect not only a pressing force but also a shearing stress or sliding friction on an object.

The following describes a tactile sensor that acquires tactile information, a method for manufacturing a tactile sensor, and a method of sensing with a tactile sensor according to embodiments of the present disclosure. It should be noted that the drawings only schematically show various elements to facilitate the understanding of the present disclosure and the elements may differ in scale ratio and appearance from their actual counterparts.

A tactile sensor according to an aspect of the present disclosure includes: a first sheet having at least either flexibility or elasticity; and a second sheet having at least either flexibility or elasticity that is disposed on the first sheet. The second sheet has a plurality of protrusions having enclosed spaces between an inside surface of the second sheet and the first sheet. At least one second electrode pattern is disposed on inside surfaces of the plurality of protrusions. At least one first electrode patterns is disposed on the first sheet in the enclosed spaces of the plurality of protrusions. These enclosed spaces may be ones defined by the second sheet and the first sheet. Further, in the enclosed space of each of the plurality of protrusions, the at least one first electrode pattern includes a plurality of first electrode patterns and/or the at least one second electrode pattern includes a plurality of second electrode patterns. The enclosed spaces may be airtight spaces.

Since the tactile sensor thus includes the first sheet and the second sheet, which have at least either flexibility or elasticity, it can flexibly deform in conformance with an external stress. Further, since the tactile sensor has the plurality of protrusions, it can disperse pressure that is applied to an object when the object is grasped. Furthermore, since the tactile sensor has the enclosed spaces between the inside surfaces of the plurality of protrusions and the first sheet, the plurality of protrusions can make contact with the object by flexibly deforming like rubber balloons even under increased grip force. Further, since the at least one second electrode pattern is disposed on the inside surfaces of the plurality of protrusions, a deformation of the plurality of protrusions can be sensed. This makes it possible to detect not only a pressing force on the object but also a shearing stress or sliding friction from the direction of a deformation of the plurality of protrusions.

Furthermore, a deformation of the plurality of protrusions can be sensed on the basis of a change in capacitance between opposed second and first electrode patterns.

For example, in a tactile sensor according to an aspect of the present disclosure, the plurality of second electrode patterns may be disposed on the inside surfaces of the plurality of protrusions, and the plurality of second electrode patterns may extend in parallel.

When the plurality of protrusions deform in conformance with an external stress, the second electrode patterns deform in conformance therewith accordingly. Thus, the parallel extension of the plurality of second electrode patterns makes it possible to sense in more detail a state where the plurality of protrusions deform in such a direction as to intersect the second electrode patterns.

For example, in a tactile sensor according to an aspect of the present disclosure, the plurality of first electrode patterns may be disposed in enclosed spaces on a surface of the first sheet that faces the second sheet, and the plurality of first electrode patterns may extend in parallel.

When the plurality of protrusions deform in conformance with an external stress, the second electrode pattern disposed on the inside surfaces of the plurality of protrusions deform in conformance therewith accordingly. At the same time, the parallel extension of the plurality of first electrode patterns increases combinations of opposed second and first electrode patterns, thus making it possible to measure a change in capacitance between these opposed electrode patterns. This makes it possible to sense a deformation of the plurality of protrusions in more detail.

For example, in a tactile sensor according to an aspect of the present disclosure, the second electrode pattern and the first electrode pattern may intersect each other in a plan view.

This makes it possible to sense a deformation of the plurality of protrusions in two different directions, thus making it possible to sense a pressing force and a shearing stress or sliding friction more accurately than in a case where the first and second electrode patterns do not intersect each other in a plan view. The term "plan view" as used herein means spreading the first sheet on a flat surface and observing the first sheet from an angle perpendicular to the first sheet.

For example, in a tactile sensor according to an aspect of the present disclosure, the second sheet may be constituted by an elastomer.

This allows the plurality of protrusions to easily conform to the surface shape of an object and a stress. Use of the tactile sensor makes it possible, for example, to easily sense that an object being grasped by a robot hand or the like gets out of position from an initial state where the object starts moving out of position, i.e., an initial state where a shearing stress is applied to the plurality of protrusions.

For example, in a tactile sensor according to an aspect of the present disclosure, the first electrode pattern and the second electrode pattern may have elasticity.

This prevents the flexibility or elasticity of the first sheet and the second sheet from being impaired.

For example, in a tactile sensor according to an aspect of the present disclosure, the second electrode pattern may be electrically connected at the plurality of protrusions.

The electrical connection of the second electrode pattern over the plurality of protrusions makes it possible to simplify the configuration of a measuring device.

For example, in a tactile sensor according to an aspect of the present disclosure, the first electrode pattern may be electrically connected at regions of the first sheet that correspond to the plurality of protrusions.

The electrical connection of the first electrode pattern over the regions corresponding to the plurality of protrusions makes it possible to simplify the configuration of a measuring device.

For example, in a tactile sensor according to an aspect of the present disclosure, the enclosed spaces may be filled with a fluid, and the enclosed spaces may have inside an elastomer that is higher in flexibility than the first sheet and the second sheet.

Thus, the tactile sensor has inside the enclosed spaces a fluid (e.g., air) or an elastomer that is higher in flexibility than the first sheet and the second sheet; therefore, even in the presence of the application of strong pressure to some of the protrusions, the fluid or the elastomer can move within the enclosed spaces by receiving a force when pressed. The movement of the fluid or the elastomer within the enclosed spaces makes it possible to disperse, within the enclosed spaces, the pressing force applied to the plurality of protrusions. This allows the plurality of protrusions to make contact with the surface of the object at uniform pressure even when the surface shape of the object has asperities.

For example, in a tactile sensor according to an aspect of the present disclosure, each of the plurality of protrusions may have a meandering shape in a plan view of the second sheet.

Thus, the tactile sensor has a series of enclosed spaces; therefore, even in the presence of the application of strong pressure to some of the protrusions of meandering shapes, the fluid can move within the enclosed spaces by receiving a force when pressed. The movement of the fluid within the enclosed spaces makes it possible to disperse, within the enclosed spaces, the pressing force applied to the plurality of protrusions. This allows the plurality of protrusions to make contact with the surface of an object at uniform pressure even when the surface shape of the object has asperities.

A method for manufacturing a tactile sensor according to an aspect of the present disclosure includes: an electrode pattern forming step of forming a second electrode pattern on a first surface of a second sheet; a protrusion forming step of forming a plurality of protrusions on a surface opposite to the first surface by forming a plurality of concave portions on the first surface of the second sheet; and a bonding step of forming enclosed spaces between inside surfaces of the plurality of protrusions and a first sheet by bonding the first surface of the second sheet to the first sheet.

This makes it possible to obtain a tactile sensor that can detect not only a pressing force but also a shearing stress or sliding friction on an object.

A method of sensing with a tactile sensor according to an aspect of the present disclosure includes: a measuring step of measuring a change in capacitance between at least one second electrode pattern and at least one first electrode pattern; and a sensing step of sensing a deformation of each of the plurality of protrusions on the basis of the change in capacitance.

For this reason, use of the tactile sensor makes it possible to sense a deformation of each of the plurality of protrusions on the basis of the change in capacitance, thus making it possible to sense an initial state where a shearing stress or sliding friction arises in the plurality of protrusions. This makes it possible, for example, to appropriately control the force with which a robot hand or the like grasps an object.

Further, use of the tactile sensor makes it possible to sense a deformation of each of the plurality of protrusions on the basis of a change in capacitance between opposed second and first electrode patterns. This makes it possible to more accurately sense an initial state where a shearing stress or sliding friction arises in the plurality of protrusions. This makes it possible, for example, to appropriately control the force with which a robot hand or the like grasps an object.

The following describes embodiments of the present disclosure in more detail with reference to the drawings.

It should be noted that each of the embodiments to be described below shows a general or specific example. The numerical values, the shapes, the materials, the constituent elements, the placement location and connection configuration of the constituent elements, the steps, the order of the steps, and the like that are shown in the following embodiments are mere examples and are not intended to limit the present disclosure. Further, those of the constituent elements in the following embodiments which are not recited in an independent claim representing the most generic concept are described as optional constituent elements. Further, each drawing is not necessarily strictly illustrated. Each drawing gives the same reference numerals to substantially the same components so that a repeated description may be omitted or simplified.

Embodiment 1

FIG. 1 is a diagram including a perspective view and an enlarged cross-sectional view schematically showing a configuration of a tactile sensor 100a according to Embodiment 1. FIG. 1 shows an example in which the tactile sensor 100 is fitted at a fingertip of a robot hand 70 and used in control for grasping an object 60. The following describes examples in which tactile sensors according to all embodiments of the present disclosure are fitted at fingertips of robot hands for use.

As shown FIG. 1, the tactile sensor 100a according to Embodiment 1 includes a first sheet 1 and a second sheet 2 disposed on the first sheet 1. The second sheet 2 has a plurality of protrusions 3 having enclosed spaces 4 between an inside surface of the second sheet 2 and the first sheet 1. The tactile sensor 100a includes at least one second electrode pattern (e.g., in Embodiment 1, two second electrode patterns 5a and 5b) disposed on inside surfaces of the plurality of protrusions 3. The second sheet 2 is fixedly bonded to the first sheet 1 at the part of the surface opposite to the surface on which the plurality of protrusions 3 have been formed, the part being other than the parts where the plurality of protrusions 3 have been formed. This causes the enclosed spaces 4 to be formed between the inside surfaces of the plurality of protrusions 3 and the first sheet 1. The enclosed spaces 4 are defined by the first sheet 1 and the second sheet 2. In Embodiment 1, the enclosed spaces 4 are filled with air. Furthermore, the tactile sensor 100 includes at least one first electrode pattern (e.g., in Embodiment 1, one first electrode pattern 5c) on the first sheet 1 in the enclosed spaces 4.

It should be noted that although, in a tactile sensor according to the present disclosure, the first sheet and the second sheet have at least either flexibility or elasticity, the first sheet and the second sheet may have not only flexibility but also elasticity. In Embodiment 1 of the present disclosure, the first sheet 1 and the second sheet 2 have both flexibility and elasticity.

Figure 2A:
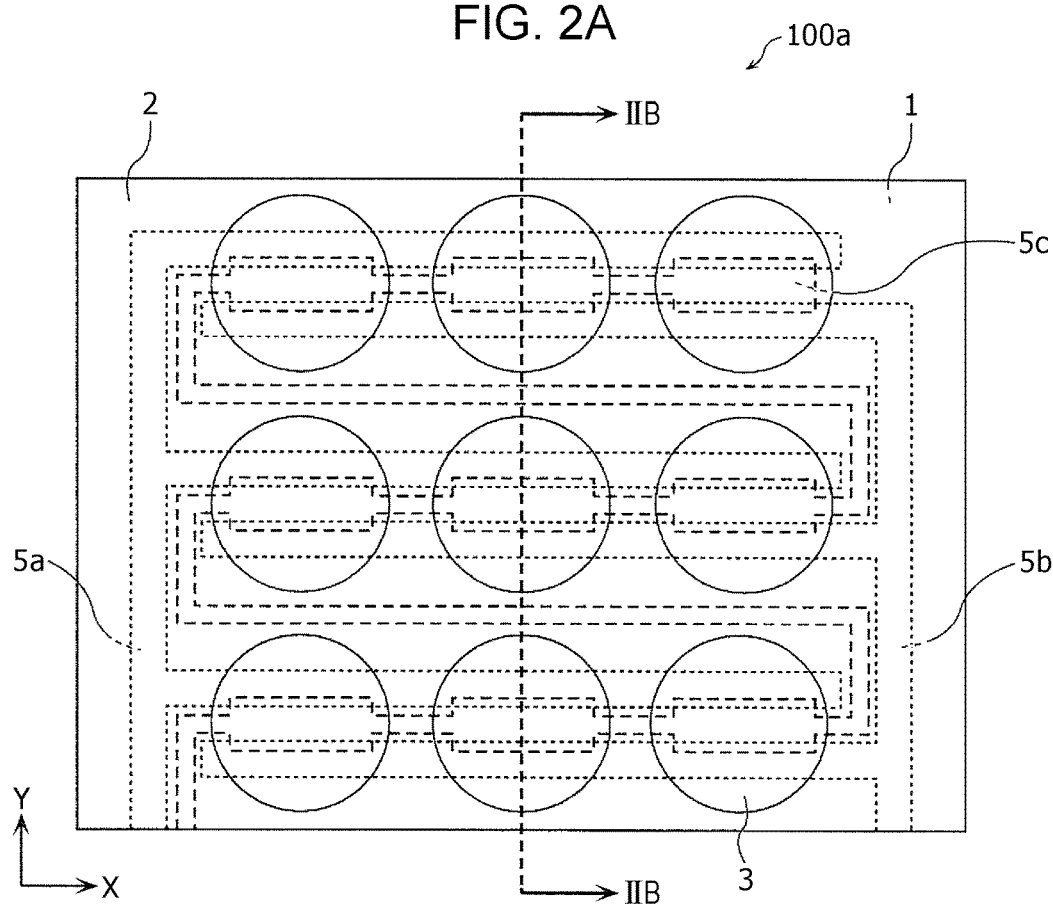
FIG. 2A is a top view schematically showing the configuration of the tactile sensor according to Embodiment 1.
Figure 2B:
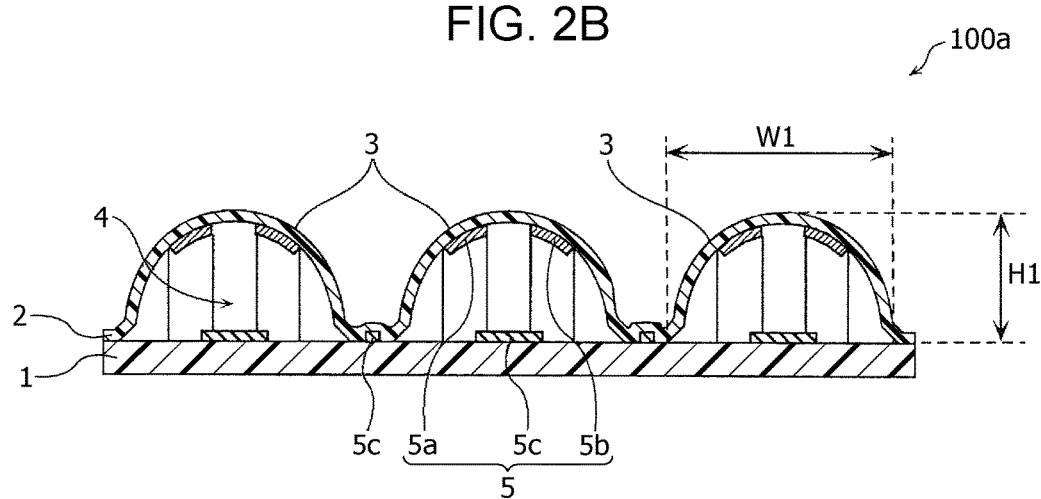
FIG. 2B is a schematic cross-sectional view taken along line IIB-IIB in FIG. 2A.

FIG. 2A is a top view schematically showing the configuration of the tactile sensor 100a according to Embodiment 1. FIG. 2B is a schematic cross-sectional view taken along line IIB-IIB in FIG. 2A.

As shown in FIG. 2A, the tactile sensor 100a includes a plurality of second electrode patterns 5a and 5b disposed on the inside surface of each of the plurality of protrusions 3, and the second electrode patterns 5a and 5b extend in parallel. Further, as mentioned above, the tactile sensor 100a includes one electrode pattern 5c on the first sheet 1 in each enclosed space 4. Note here that the first electrode pattern 5c and the second electrode patterns 5a and 5b have elasticity. Further, the second electrode pattern 5a in the enclosed space 4 of each of the plurality of protrusions 3 is electrically connected to the second electrode pattern 5a in another enclosed space 4. Further, the second electrode pattern 5b in the enclosed space 4 of each of the plurality of protrusions 3 is electrically connected to the second electrode pattern 5b in another enclosed space 4. Further, the first electrode pattern 5c in the enclosed space 4 of each of the plurality of protrusions 3 is electrically connected to the first electrode pattern 5c in another enclosed space 4.

As shown in FIGS. 2A and 2B, in Embodiment 1, each of the plurality of protrusions 3 has a hemispherical shape. The second sheet 2 has a first surface and a second surface opposite to the first surface. As shown in FIG. 2B, the plurality of protrusions 3 are formed on the first surface of the second sheet 2 so as to each have a predetermined height H1 and a predetermined width W1. It should be noted that the width W1 indicates the longest diameter of the protrusion 3 in a plan view of the second sheet 2. The second sheet 2 is fixedly bonded to the first sheet 1 at the part around the width W1 of each of the plurality of protrusions 3.

A sensing section 5 that senses a deformation of a protrusion 3 is constituted by the second electrode patterns 5a and 5b and the first electrode pattern 5c. In the tactile sensor 100a according to Embodiment 1, a measuring device (not illustrated) connected to the tactile sensor 100a is used to measure the capacitance between the second electrode pattern 5a and the first electrode pattern 5c and the capacitance between the second electrode pattern 5b and the first electrode pattern 5c. A state of deformation, e.g., a direction of deformation, of the plurality of protrusions 3 can be measured by a processor (not illustrated) acquiring the result of a measurement carried out by the measuring device (not illustrated). Further, the processor can calculate, on the basis of the result of a measurement carried out by the measuring device, information such as a pressing force, a shearing stress, or sliding friction applied to the plurality of protrusions 3. This makes it possible to acquire comprehensive information on a state of deformation of the plurality of protrusions 3. The sensing sections 5, each of which is constituted by second electrode patterns 5a and 5b and a first electrode pattern 5c, share these electrode patterns 5a to 5c among the plurality of protrusions 3, and each of the electrode patterns is routed so as not to become short-circuited. For this reason, use of the tactile sensor 100a makes it possible to acquire comprehensive information on a state of deformation of the plurality of protrusions 3. It should be noted that the tactile sensor 100a is an example of sensing a shearing stress in a Y direction shown in FIG. 2A, e.g., a direction parallel to the surface of the object 60.

FIG. 3 illustrates cross-sectional views schematically showing how the tactile sensor 100a according to Embodiment 1 operates. Prior to contact with the object 60, the tactile sensor 100a is in a state shown in FIG. 3(a) and each of the plurality of protrusions 3 has a hemispherical shape. At this point in time, the capacitance between the second electrode pattern 5a and the first electrode pattern 5c of the sensing section 5 and the capacitance between the second electrode pattern 5b and the first electrode pattern 5c take on substantially the same value. This value is referred to as a zero point of tactility.

In the tactile sensor 100a, the second sheet 2 is constituted by an elastomer. Further, as mentioned above, in the tactile sensor 100a, the enclosed spaces 4 between the inside surfaces of the plurality of protrusions 3 and the first sheet 1 are filled with air.

For that reason, as shown in FIG. 3(b), when the plurality of protrusions 3 start making contact with the object 60, each of the plurality of protrusions 3 starts deforming into a shape that conforms to the surface of the object 60 from the top of the protrusion 3 like a rubber balloon. In conformance with the deformation of the protrusion 3, the second electrode patterns 5a and 5b deform by being pressed toward the inside surface of the protrusion 3 and come close to the first electrode pattern 5c. For that reason, the capacitance between the second electrode pattern 5a and the first electrode pattern 5c of the sensing section 5 and the capacitance between the second electrode pattern 5b and the first electrode pattern 5c both become higher than they are in the state shown in FIG. 3(a) where the tactile sensor 100a is yet to make contact with the object 60. Use of the tactile sensor 100a makes it possible to find, from the amounts of change in capacitance in the sensing section 5, the directions of a pressing force and a shear applied to the plurality of protrusions 3 from the object 60. This makes it possible to obtain, as information relating to the particular area where the protrusions 3 have been formed, whether the object 60 is grasped with appropriate grip pressure.

However, if the object 60 being grasped by the robot hand 70 is heavy, if the object 60 increases in weight in a grasped state, or if the object 60 being grasped moves out of position, the plurality of protrusions 3 formed in the tactile sensor 100a become strained. For example, as shown in FIG. 3(c), if the object 60 being grasped by the robot hand 70 moves out of position in the direction of an arrow, a shearing state or a sliding state arises between the tactile sensor 100a and the object 60. For example, in a case where the object 60 is being grasped by the robot hand 70, leaving the shearing state or the sliding state as it is causes the trouble of the robot hand 70 dropping the object 60.

Further, typical examples of trouble that are difficult to handle with the robot hand 70 include a case where the object 60 increases in weight in a grasped state. Assume that the object 60 is a cup. In a state where the cup is being grasped empty by the robot hand 70, pouring a liquid such as a beverage into the cup makes the cup heavier. In the case of such control that the object 60 is grasped with a constant force, an increase in weight of the object 60 that surpasses the grip force causes the trouble of the robot hand 70 dropping the cup. However, use of the tactile sensor 100a makes it possible to sense an initial state where a shearing stress or sliding friction arises in the plurality of protrusions 3, thus making it possible to exercise control that prevents the occurrence of the aforementioned trouble.

In FIG. 3(c), in the presence of the application of a shearing stress in the direction of the arrow, the plurality of protrusions 3 are deformed in conformance with the direction of the shearing stress. In conformance with such a deformation of the plurality of protrusions 3, the second electrode patterns 5a and 5b, too, move in the direction of the shearing stress. Meanwhile, the first electrode pattern 5c hardly moves in conformance with the direction of the shearing stress, as it is fixed to the robot hand 70 together with the first sheet 1. For that reason, the capacitance between the second electrode pattern 5a and the first electrode pattern 5c becomes lower than it was before the application of the shearing stress, and the capacitance between the second electrode pattern 5b and the first electrode pattern 5c becomes higher than it was before the application of the shearing stress. That is, the deformation of the plurality of protrusions 3 in conformance with the direction of the shearing stress causes the second electrode pattern 5b and the first electrode pattern 5c to overlap each other by a larger area in a plan view and causes the second electrode pattern 5a and the first electrode pattern 5c to overlap each other by a smaller area in a plan view. This causes such changes in capacitance among the electrode patterns. Use of the tactile sensor 100a according to Embodiment 1 makes it possible to sense, that a strain deformation is being applied in a shearing direction. Meanwhile, in a state where a slide occurs when the plurality of protrusions 3 conform to the direction of the shearing stress, the plurality of protrusions 3 are pulled back in a direction opposite to the direction of the shearing stress. For that reason, in a case where a slide occurs, the strain deformation in the shearing direction is sensed in such a form as to vibrate.

In Embodiment 1, the plurality of protrusions 3 easily deform in conformance with the direction of the shearing stress, as they are constituted by an elastic elastomer with the enclosed spaces 4 filled with air like rubber balloons. For that reason, use of the tactile sensor 100a according to Embodiment 1 makes it possible to easily sense, from an initial state where the object 60 being grasped by the robot hand 70 starts moving out of position, i.e., an initial state where the shearing stress is applied to the plurality of protrusions 3, that the object 60 being grasped gets out of position. This enables control for preventing the trouble of the robot hand 70 dropping the object 60 it grasped.

FIG. 3(d) shows a state of the tactile sensor 100a with appropriately increased grip force of the robot hand 70 as an example of control that prevents the aforementioned trouble by detecting a shearing stress applied to the plurality of protrusions 3. Such appropriately increased grip force of the robot hand 70 lead to further increases in deformation of the tops of the plurality of protrusions 3, so that there is an increase in the area of contact by which the tops of the plurality of protrusions 3 press the surface of the object 60. An increase in the area of contact between the plurality of protrusions 3 and the object 60 due to pressing leads to a decrease in volume of the enclosed spaces 4. Such an increase in pressure of the fluid inside the enclosed space 4 due to pressing allows the robot hand 70 to firmly grasp the object 60. Further, the increase in pressure of the enclosed spaces 4 leads to an increase in shape retention of the plurality of protrusions 3, which leads to a less strain deformation in the shearing direction as shown in FIG. 3(d) than in the state of FIG. 3(c). Because of such deformation properties, it is possible to control the grip force so that a strain in the shearing direction does not exceed a predetermined value.

For example, in the case of a robot hand having a fingertip made of a hard material or a smooth-surfaced uniformly-flat fingertip, there is concern that the application of increased grip force to the object 60 by the robot hand may deform or destruct the object 60. However, since the tactile sensor 100a according to Embodiment 1 includes the first sheet 1 and the second sheet 2, which have at least either flexibility or elasticity, it can flexibly deform in conformance with an external stress. Further, since the tactile sensor 100a has the plurality of protrusions 3, it can disperse pressure that is applied to the object 60 when the object 60 is grasped.

Furthermore, since the tactile sensor 100a have the enclosed spaces 4 between the inside surfaces of the plurality of protrusions 3 and the first sheet 1 and the enclosed spaces 4 are filled with air, the plurality of protrusions 3 can make contact with the object 60 by flexibly deforming like rubber balloons even under increased grip force. Further, even under increased grip force of the robot hand 70, the plurality of protrusions 3, as shown in FIG. 3(d), deform in conformance with the surface of the object 60 from the tops and increase in the area by which they make contact with the object 60. For that reason, even under increased grip force of the robot hand 70, the pressure on the surface of the object 60 per unit area hardly increases in proportion to the grip force.

Further, as shown in the enlarged cross-sectional view of FIG. 1, each of the plurality of protrusions 3 can deform in conformance with the surface shape of the object 60 even in a case where the object 60 has a non-uniform surface with asperities. For that reason, even when the robot hand 70 applies increased grip force to the object 60, locally strong pressure is hardly applied to the object 60. This makes it possible to better reduce the trouble of the object 60 being deformed or destructed than a conventional robot hand.

Figure 4:
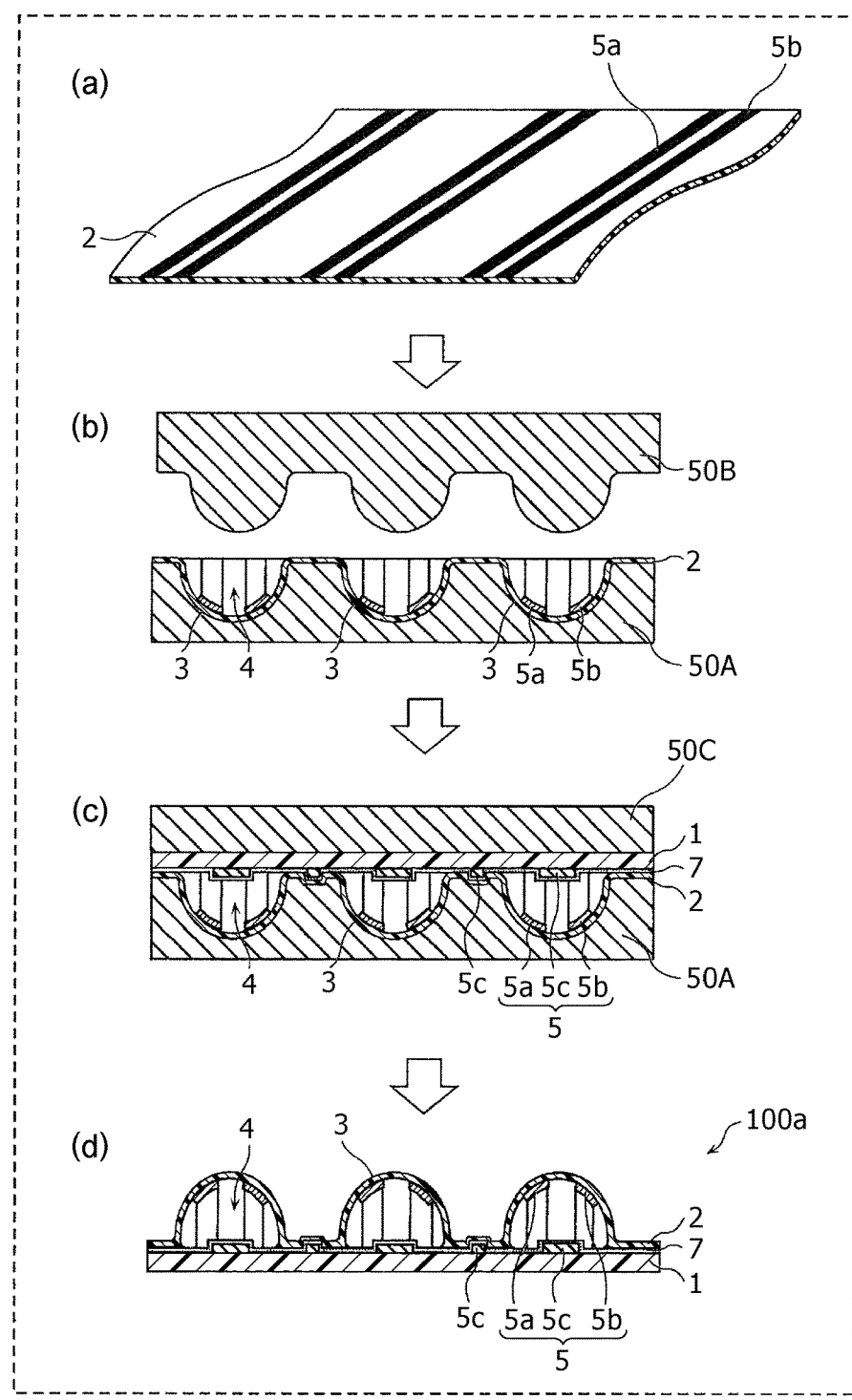
FIG. 4 illustrates diagrams explaining a method for manufacturing a tactile sensor according to Embodiment 1.

Next, a method for manufacturing a tactile sensor 100a according to Embodiment 1 is described. FIG. 4 illustrates diagrams explaining a method for manufacturing a tactile sensor 100a according to Embodiment 1.

Electrode Pattern Forming Step

First, as shown in FIG. 4(a), the second electrode patterns 5a and 5b are formed by printing a conducive paste onto the first surface of the second sheet 2. The second sheet 2 used here is a polyurethane sheet having flexibility and elasticity, and the conductive paste used here is a paste obtained by mixing powdered silver into urethane resin having elasticity. Since both the second sheet 2 and the second electrode patterns 5a and 5b have elasticity, use of a sheet obtained in this step makes it possible to form a plurality of protrusions 3 that can flexibly conform to the shape of an object and a shearing stress. The flexible conformance of the plurality of protrusions 3 to the shape of an object allows each of the plurality of protrusions 3 to make surface contact with the object. For that reason, even under increased grip force of the robot hand, locally strong pressure is hardly applied to the object. Further, the flexibly conformance of the plurality of protrusions 3 to a shearing stress makes it possible to detect the magnitude and direction of the shearing stress. For that reason, use of the tactile sensor 100a according to Embodiment 1 in a robot hand makes it possible control the grip force of the robot hand so that the grip force is of appropriate strength.

Protrusion Forming Step

Then, as shown in FIG. 4(b), the second sheet 2 is placed so that the second surface of the second sheet 2 opposite to the first surface on which the second electrode patterns 5a and 5b have been formed faces a mold 50A. For example, the plurality of protrusions 3 are molded by pressing the second sheet 2 while heating it. It should be noted that, in the protrusion forming step, the plurality of protrusions 3 may be molded by placing the second sheet 2 in concave portions of the mold 50A and pressing the second sheet 2 with a pressing mold 50B from above. Alternatively, the plurality of protrusions 3 may be molded by pressurizing the second sheet 2 under pneumatic pressure or hydraulic pressure. Alternatively, the plurality of protrusions 3 may be formed by providing vacuuming paths in the concave portions of the mold 50A and vacuuming the second sheet 2 along the shape of the mold 50A. In this case, since both the second sheet 2 and the second electrode patterns 5a and 5b are made of materials that excel in elasticity, the plurality of protrusions 3 can be easily molded along the shape of the mold 50A.

Bonding Step

Then, as shown in FIG. 4(c), the first sheet 1 is put on top of the second sheet 2 so that the surface on which the first electrode pattern 5c has been formed faces the mold 50A, and is pressed by a mold 50C. This causes the second sheet 2 to be bonded to the first sheet 1. Here, a region of the second sheet 2 other than the parts where the plurality of protrusions 3 have been molded is bonded to the first sheet 1 via an adhesive layer 7. This causes the enclosed spaces 4 to be formed inside the plurality of protrusions 3. The second sheet 2 and the first sheet 1 can be bonded together by putting a thermoplastic urethane sheet as the adhesive layer 7 between the second sheet 2 and the first sheet 1, softening the adhesive layer 7 by heating it under pressure between the mold 50A and the mold 50C, and then cooling the adhesive layer 7. This makes it possible to, as shown in FIG. 4(d), manufacture a tactile sensor 100a having enclosed spaces 4. Instead of the adhesive layer 7 provided all over the first sheet 1 here, an adhesive layer 7 provided with holes corresponding to the parts of the first sheet 1 where the plurality of protrusions 3 have been formed may be used to bond the first sheet 1 and the second sheet 2 by the region other than the parts where the plurality of protrusions 3 have been molded. Since the tactile sensor 100a measures the capacitance between electrodes, it can measure a change in capacitance even in the presence of the adhesive layer 7 in the gap between the electrodes and can therefore sense tactility. It should be noted that, for ease of explanation, the drawings other than FIG. 4 omit to illustrate the adhesive layer 7.

The manufacturing method has been described above by taking, as an example, a case where the enclosed spaces 4 formed in the bonding step are filled with air. In another aspect, as mentioned above, the enclosed spaces 4 may be filled with a fluid or an elastomer that is higher in flexibility than the first sheet 1 and the second sheet 2. In such an aspect, the concave portions, which are equivalent to the enclosed spaces 4 of the plurality of protrusions 3, are filled with a fluid such as a liquid or a resin material before the first sheet 1 is put on top of the second sheet 2 after the protrusion forming step. After this filling step, the bonding step is executed. This makes it possible to fill the enclosed spaces 4 with silicone oil or flexible urethane resin.

Embodiment 2

Figure 5A:
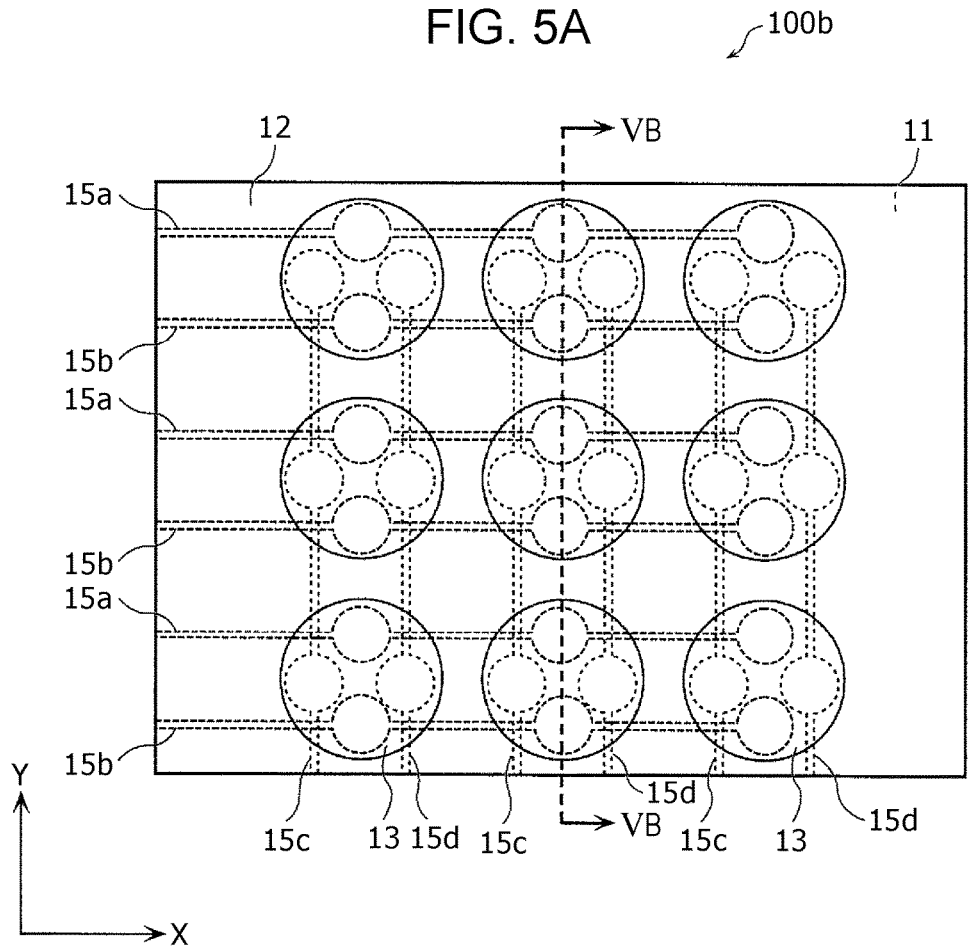
FIG. 5A is a top view schematically showing a configuration of a tactile sensor according to Embodiment 2.
Figure 5B:
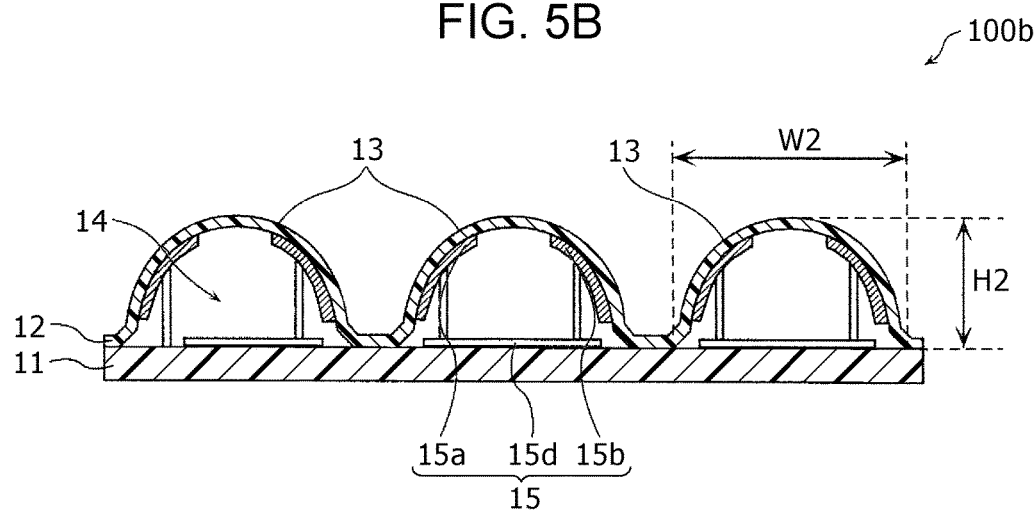
FIG. 5B is a schematic cross-sectional view taken along line VB-VB in FIG. 5A.

FIG. 5A is a top view schematically showing a configuration of a tactile sensor 100b according to Embodiment 2. FIG. 5B is a schematic cross-sectional view taken along line VB-VB in FIG. 5A.

Embodiment 2 differs from Embodiment 1 in that a plurality of first electrode patterns 15c and 15d and a second electrode patterns 15a and 15b are disposed to intersect each other in a plan view. Further, a sensing section 15 is constituted by the four electrode patterns 15a to 15d. The plurality of first electrode patterns 15c and 15d extend in parallel, and the plurality of second electrode patterns 15a and 15b extend in parallel. This allows the tactile sensor 100b according to Embodiment 2 to detect, in addition to a pressing force on an object, an X-direction and Y-direction shearing stress in a plane parallel to a first sheet 11.

It should be noted that since the tactile sensor 100b according to Embodiment 2 is identical to the tactile sensor 100a according to Embodiment 1 except for the aforementioned differences, a description of overlapping parts is partially omitted. Further, the tactile sensor 100b according to Embodiment 2 has its enclosed spaces 14 filled with air.

As shown in FIGS. 5A and 5B, in the tactile sensor 100b according to Embodiment 2, as in the tactile sensor 100a according to Embodiment 1, each of a plurality of protrusions 13 has a hemispherical shape. Further, as shown in FIG. 5B, the plurality of protrusions 13 are formed on a first surface of a second sheet 12 so as to each have a predetermined height H2 and a predetermined width W2. The second sheet 12 is fixedly bonded to the first sheet 11 at the part around the width W2 of each of the plurality of protrusions 13.

A sensing section 15 that senses a deformation of a protrusion 3 is constituted by the second electrode patterns 15a and 15b and the first electrode patterns 15c and 15d. In the tactile sensor 100b according to Embodiment 2, as in Embodiment 1 described above, a measuring device (not illustrated) connected to the tactile sensor 100b is used to measure the capacitance between the second electrode pattern 15a and the first electrode pattern 15c, the capacitance between the second electrode pattern 15a and the first electrode pattern 15d, the capacitance between the second electrode pattern 15b and the first electrode pattern 15c, the capacitance between the second electrode pattern 15b and the first electrode pattern 15d. A state of deformation, e.g., a direction of deformation, of the plurality of protrusions 13 can be measured by a processor (not illustrated) acquiring the result of a measurement carried out by the measuring device (not illustrated). Further, the processor can calculate, on the basis of the result of a measurement carried out by the measuring device, information such as a pressing force, an X-direction and Y-direction shearing stress, or sliding friction applied to the plurality of protrusions 13. This makes it possible to acquire comprehensive information on a state of deformation of the plurality of protrusions 13.

The second electrode patterns 15a and 15b disposed on inside surfaces of the plurality of protrusions 13 each extend in the X direction, and a plurality of protrusions 13 that are adjacent to one another in the X direction are electrically connected to each other. Further, the first electrode patterns 15c and 15d disposed on a surface of the first sheet 11 that faces the second sheet 12 each extend in the Y direction, and are disposed to pass through regions corresponding to a plurality of protrusions 13 that are adjacent to one another in the Y direction. Thus, the second electrode patterns 15a and 15b and the first electrode patterns 15c and 15d constitute a matrix of wires extending in the X direction and the Y direction in a plan view. The intersections between the second electrode patterns 15a and 15b extending in the X direction and the first electrode patterns 15c and 15d extending in the Y direction are spaced from one another in the enclosed spaces 4 and are therefore prevented from becoming short-circuited with one another.

Since these electrode patterns constitute a matrix of wiring patterns in the X direction and the Y direction, electrically scanning the ends of lead wires in the X direction and the Y direction with use of a measuring device makes it possible to individually measure the capacitances between the second electrode patterns 15a and 15b in each protrusion 13 and the first electrode patterns 15c and 15d facing the second electrode patterns 15a and 15b.

The sensing section 15 is described here with reference to an operation of sensing a state of deformation of the protrusion 13 from a measurement of each capacitance between opposed electrode patterns.

First, consider a case where the capacitance between the second electrode pattern 15a and the first electrode pattern 15c, the capacitance between the second electrode pattern 15a and the first electrode pattern 15d, the capacitance between the second electrode pattern 15b and the first electrode pattern 15c, the capacitance between the second electrode pattern 15b and the first electrode pattern 15d all similarly increase. In this case, the grasping of an object by the robot hand causes the plurality of protrusions 13 to press the object and start deforming in such a form as to conform to the surface of the object from the tops of the protrusions 13. Here, assume that no shearing stress has arisen, as the object is being stably grasped. For that reason, the plurality of protrusions 13 press the object perpendicularly to the surface of the object, so that the distances between the second electrode patterns 15a and 15b and the first electrode patterns 15c and 15d uniformly become shorter. This substantially equalizes the amounts of change in capacitance of all of the four pairs of opposed electrode patterns in the sensing section 15, thus making it possible to sense the force with which the plurality of protrusions 13 press the object and the direction of the pressing force.

Next, consider a case where the amounts of change in capacitance between the second electrode patterns 15a and 15b and the first electrode patterns 15c and 15d (i.e., capacitance of the four pairs of opposed electrode patterns) are different from one another. For example, in the case of a −Y-direction deformation, the area of an overlap between the second electrode pattern 15a and the first electrode pattern 15c in a plan view and the area of an overlap between the second electrode pattern 15a and the first electrode pattern 15d in a plan view increase. Accordingly, the capacitance between the second electrode pattern 15a and the first electrode pattern 15c and the capacitance between the second electrode pattern 15a and the first electrode pattern 15d increase. Meanwhile, the area of an overlap between the second electrode pattern 15b and the first electrode pattern 15c in a plan view and the area of an overlap between the second electrode pattern 15b and the first electrode pattern 15d in a plan view decrease. Accordingly, the capacitance between the second electrode pattern 15b and the first electrode pattern 15c and the capacitance between the second electrode pattern 15b and the first electrode pattern 15d decrease. Thus, a Y-direction (i.e., +Y-direction and −Y-direction) shearing stress can be sensed by sensing the amounts of change in the capacitance between the second electrode pattern 15a and the first electrode pattern 15c and the capacitance between the second electrode pattern 15a and the first electrode pattern 15d and the amounts of change in the capacitance between the second electrode pattern 15b and the first electrode pattern 15c and the capacitance between the second electrode pattern 15b and the first electrode pattern 15d.

It should be noted that an X-direction shearing stress can be similarly sensed also in the case of a deformation of the plurality of protrusions 13 in the X direction (i.e., a +X direction and a −X direction). That is, an X-direction shearing stress can be sensed by sensing the amounts of change in the capacitance between the second electrode pattern 15a and the first electrode pattern 15c and the capacitance between the second electrode pattern 15a and the first electrode pattern 15d and the amounts of change in the capacitance between the second electrode pattern 15b and the first electrode pattern 15c and the capacitance between the second electrode pattern 15b and the first electrode pattern 15d.

It should be noted that a method for manufacturing a tactile sensor 100b according to Embodiment 2 is identical to the method for manufacturing a tactile sensor 100a according to Embodiment 1 and is therefore not described here.

REFERENCE

Figure 6A:
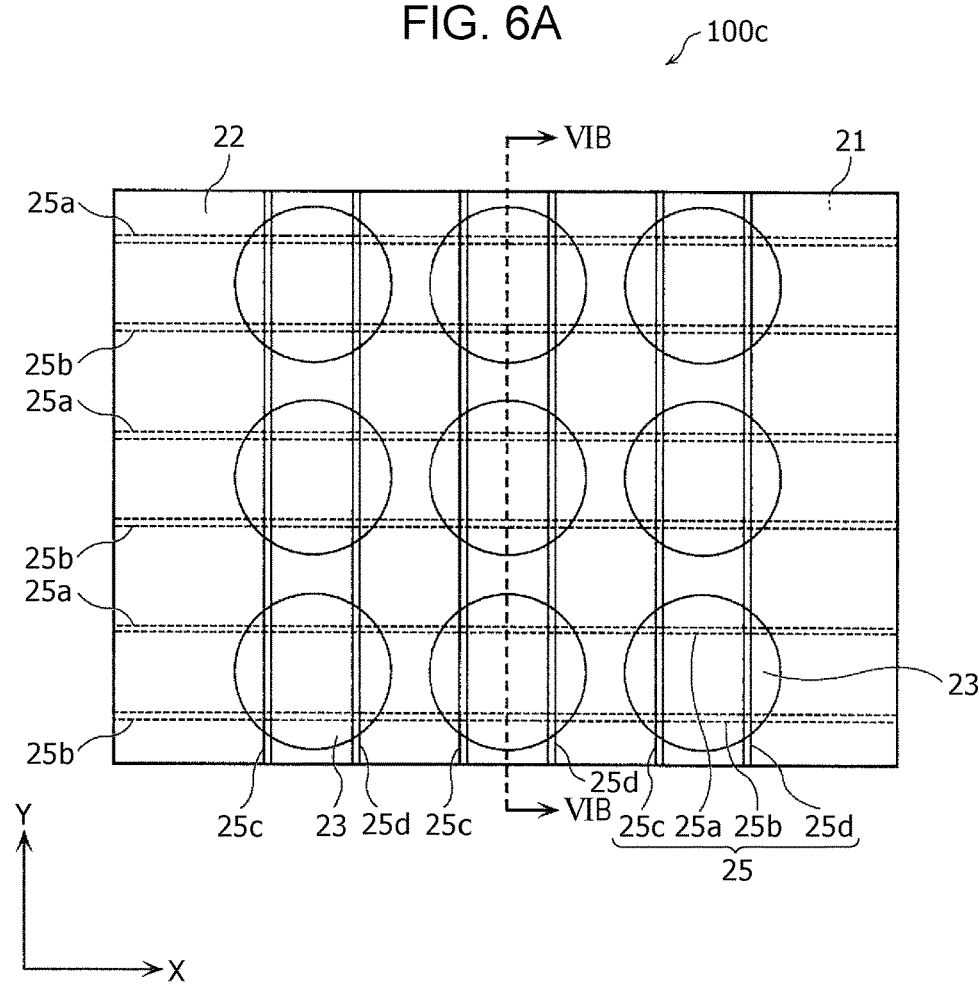
FIG. 6A is a top view schematically showing a configuration of a tactile sensor according to Reference.
Figure 6B:
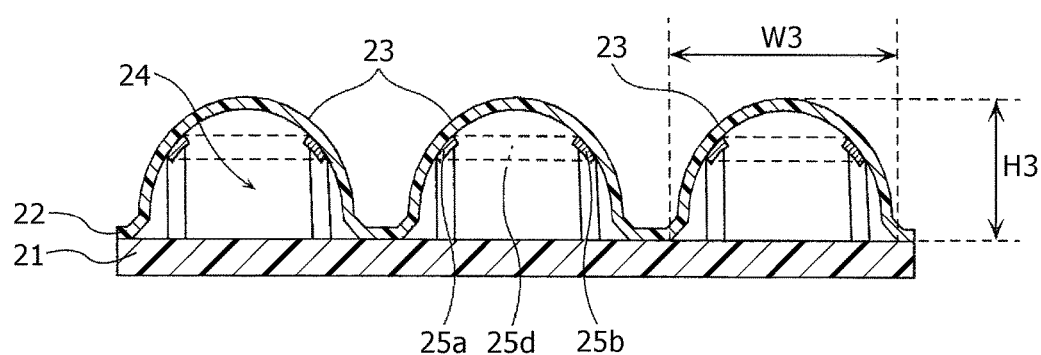
FIG. 6B is a schematic cross-sectional view taken along line VIB-VIB in FIG. 6A.

FIG. 6A is a top view schematically showing a configuration of a tactile sensor 100c according to Reference. FIG. 6B is a schematic cross-sectional view taken along line VIB-VIB in FIG. 6A.

Reference differs from Embodiments 1 and 2 in that no first electrode pattern is disposed. Third electrode patterns 25c and 25d having elasticity are disposed on a surface of a second sheet 22 that makes contact with an object. Further, second electrode patterns 25a and 25b and the third electrode patterns 25c and 25d (hereinafter sometimes referred to simply as "electrode patterns 25a to 25d") are resistance film patterns that vary in resistance according to expansion and contraction, and are disposed to intersect each other in a plan view. Further, a sensing section 25 is constituted by the four electrode patterns 25a to 25d. The plurality of second electrode patterns 25a and 25b extend in parallel, and the plurality of third electrode patterns 25c and 25d extend in parallel. This allows the tactile sensor 100c according to Reference to detect, in addition to a pressing force on an object, an X-direction and Y-direction shearing stress in a plane parallel to a first sheet 21.

It should be noted that since the tactile sensor 100c according to Reference is identical to the tactile sensor 100a according to Embodiment 1 except for the aforementioned differences, a description of overlapping parts is partially omitted. The tactile sensor 100c according to Reference has its enclosed spaces 24 filled with air.

As shown in FIGS. 6A and 6B, in the tactile sensor 100c according to Reference, as in the tactile sensor 100a according to Embodiment 1, each of a plurality of protrusions 23 has a hemispherical shape. Further, as shown in FIG. 6B, the plurality of protrusions 23 are formed on a first surface of a second sheet 22 so as to each have a predetermined height H3 and a predetermined width W3. The second sheet 22 is fixedly bonded to the first sheet 21 at the part around the width W3 of each of the plurality of protrusions 23.

The second electrode patterns 25a and 25b, which has elasticity, are disposed on inside surfaces of the plurality of protrusions 23 of the second sheet 22, each extend in the X direction, and pass through the inside surfaces of a plurality of protrusions 23 that are adjacent to one another in the X direction. The third electrode patterns 25c and 25d, which has elasticity, are disposed on the surface of the second sheet 22 that makes contact with an object, extend in the Y direction, and pass through outside surfaces of a plurality of protrusions 23 that are adjacent to one another in the Y direction. Thus, the second electrode patterns 25a and 25b and the third electrode patterns 25c and 25d constitute a matrix of wires extending in the X direction and the Y direction in a plan view. The intersections between the second electrode patterns 25a and 25b extending in the X direction and the third electrode patterns 25c and 25d extending in the Y direction are spaced from one another with the second sheet 22 interposed therebetween and are therefore prevented from becoming short-circuited with one another.

The second electrode patterns 25a and 25b and the third electrode patterns 25c and 25d can be formed, for example, by using a paste obtained by mixing powdered carbon as a resistor filler into urethane resin having elasticity. The second sheet 22 has a first surface and a second surface opposite to the first surface. The second electrode patterns 25a and 25b are formed by printing the paste onto the first surface of the second sheet 22. Further, the third electrode patterns 25c and 25d are formed by printing the paste onto the second surface of the second sheet 22 so that the third electrode patterns 25c and 25d intersect the second electrode patterns 25a and 25b in a plan view. This gives a sheet in which the electrode patterns 25a to 25d, which has high elasticity, are arranged in a matrix so as to extend in the X direction and the Y direction. It should be noted that the third electrode patterns 25c and 25d are covered with an insulating film, as they are formed on the surface that makes contact with an object that is grasped by the robot hand. Use of the sheet thus obtained makes it possible to manufacture a tactile sensor 100c according to Reference through the same method as the method for manufacturing a tactile sensor 100a according to Embodiment 1. It should be noted that the aforementioned electrode patterns 25a to 25d have the property of becoming higher in resistance as they are stretched. Further, the electrode patterns 25a to 25d are wired in a matrix. For that reason, information such as a pressing force, an X-direction and Y direction shearing stress, or sliding friction applied to each of the plurality of protrusions 23 can be calculated by electrically scanning the ends of lead wires in the X direction and the Y direction with use of a measuring device and measuring changes in resistance during expansion and contraction. For this reason, use of the tactile sensor 100c according to Reference makes it possible to acquire comprehensive information on a state of deformation of the plurality of protrusions 23.

The sensing section 25 is described below with reference to an operation of sensing a state of deformation of the protrusion 23 from a measurement of the resistance of each of the electrode patterns 25a to 25d.

First, consider changes in resistance in the sensing section 25 that occur when the robot hand including the tactile sensor 100c grasps an object. In a state where the tactile sensor 100c is yet to make contact with the object, i.e., an initial state, the resistance of each of the electrode patterns 25a to 25d is higher than the resistance they have when they have been formed on the flat second sheet 22 at the time of manufacturing. Here, when the robot hand grasps the object, the plurality of protrusions 23 press the object and start deforming in such a form as to conform to the surface of the object from the tops of the protrusions 23. At the same time, the second sheet 2, which has been stretched into hemispherical shapes by the molding of the protrusions 23, deforms in conformance with the surface of the object from the tops of the protrusions 23, whereby the shapes of the protrusions 23 gradually come closer to the pre-molding flat shapes. Accordingly, all of the electrode patterns 25a to 25d decrease in resistance. From changes entailed by such decreases in resistance, a deformation of the protrusions 23 can be sensed.

Next, consider changes in resistance in the sensing section 25 that occur in a case where a Y-direction shearing deformation has arisen in the protrusions 23, e.g., a case where the protrusions 23 have been deformed in the −Y direction. The deformation of the protrusions 23 in the Y direction is sensed by changes in resistance of the second electrode patterns 25a and 25b extending in the X direction. In a case where the protrusions 23 are deformed in the −Y direction, the surfaces of the protrusions 23 that face in the +Y direction are stretched by the shearing stress and the surfaces of the protrusions 23 that face in the −Y direction are contracted by the shearing stress. At the same time, the second electrode pattern 25a is stretched in the −Y direction and therefore becomes higher in resistance, and the second electrode pattern 25b is contracted in the −Y direction and therefore becomes lower in resistance. Thus, the sensing section 25 can sense a Y-direction shearing stress by sensing the direction of a deformation of each of the plurality of protrusions 23 on the basis of changes in resistance of the second electrode patterns 25a and 25b extending in the X direction.

It should be noted that an X-direction shearing stress can be similarly sensed from changes in resistance of the third electrode patterns 25c and 25d extending in the Y direction also in the case of a deformation of the plurality of protrusions 23 in the X direction.

Embodiment 3

Figure 7B:
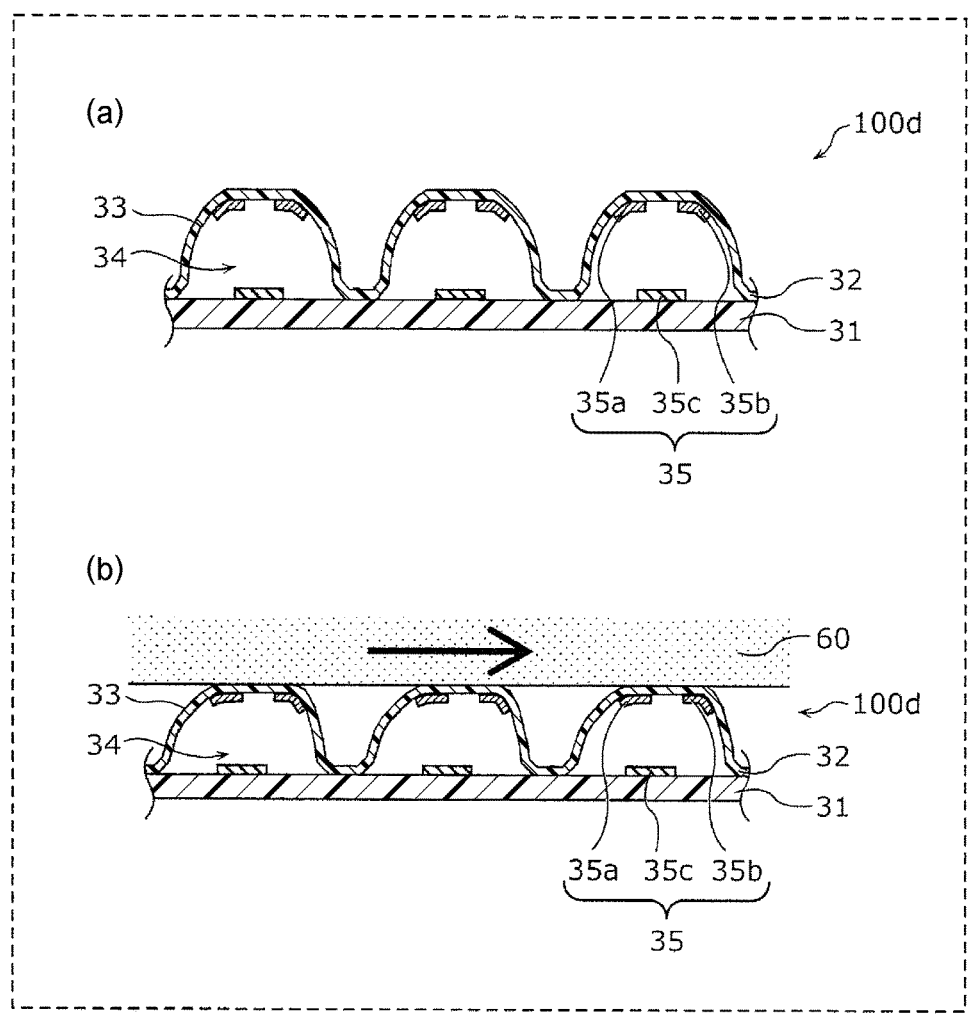
FIG. 7B illustrates schematic cross-sectional views showing a part of a cross-section taken along line VIIB-VIIB in FIG. 7A.

FIG. 7A is a top view schematically showing a configuration of a tactile sensor 100d according to Embodiment 3. FIG. 7B illustrates schematic cross-sectional views showing a part of a cross-section taken along line VIIB-VIIB in FIG. 7A.

As with Embodiment 1, the tactile sensor 100d according to Embodiment 3 has enclosed spaces 34 formed between inside surfaces of a plurality of protrusions 33 and a first sheet 31 by fixedly bonding, to the first sheet 31, a surface of a second sheet 32 opposite to a surface on which the plurality of protrusions 33 have been formed. It should be noted that the enclosed spaces 34 are filled with a liquid, e.g., silicone oil.

In Embodiment 3, unlike in Embodiments 1 and 2 and Reference, the plurality of protrusions 33 do not have hemispherical shapes but have convex shapes formed by continuously meandering at a predetermined width. While the individual protrusions 33 constitute a series of meandering shapes, looking at protrusions 33 of meandering shapes in the direction of an arrow shown in FIG. 7A shows that a plurality of protrusions 33 of a predetermined width are regularly arranged in the direction of the arrow.

Note here that in a case where a shearing stress between the plurality of protrusions 33 and an object is applied in the direction of the arrow as shown in FIG. 7A, the plurality of protrusions 33 deform in conformance with the direction of the shearing stress as shown in FIG. 7B(b). At the same time, in a sensing section 35, the area of an overlap between a second electrode pattern 35a and a first electrode pattern 35c in a plan view and the area of an overlap between a second electrode pattern 35a and the first electrode pattern 35c in a plan view change. Use of the tactile sensor 100d according to Embodiment 3 makes it possible to, by measuring and comparing the amounts of change in capacitance attributed to the changes in the areas of the overlaps in the sensing section 35, sense that a strain deformation is being applied to the plurality of protrusions 33 in the direction of the shearing stress.

As mentioned above, in Embodiment 3, the enclosed spaces 34 are filled with silicone oil; however, a liquid and a gas may be used properly as a filling fluid depending on the purpose, as a liquid and a gas have their respective features as a filling fluid. For example, in a case where the enclosed spaces 34 are filled with a gas such as air, the high fluidity of the gas allows the plurality of protrusions 33 to freely and flexibly deform like rubber balloons to conform to the object 60. Note, however, that since a gas such as air is easily volume compressible, strongly pressing the plurality of protrusions 33 against the object 60 may cause the plurality of protrusions 33 to greatly deform to such an extent that inside surfaces of the plurality of protrusions 33 formed on the second sheet 32 and a surface of the first sheet 31 that faces the second sheet 32 make contact with each other. Such contact can be avoided by designing the predetermined width of the protrusions 33 to narrow to an appropriate value. Further, such contact can also be avoided by using a liquid as a filling fluid. Since a liquid is much lower in compressibility than a gas, it is hardly compressed even under strong pressure. For that reason, in a case where the enclosed spaces 34 are filled with a fluid such as silicone oil as in the case of the tactile sensor 100d according to Embodiment 3, the protrusions 33 can avoid deforming to such an extent that the inside surfaces of the plurality of protrusions 33 formed on the second sheet 32 and the surface of the first sheet 31 that faces the second sheet 32 make contact with each other. However, since a liquid does not have as high fluidity as a gas, the conformability of the plurality of protrusions 33 to a stress is more limited than in a case where the enclosed spaces 34 are filled with a gas such as air.

Further, the protrusions 33 according to Embodiment 3 are not independent protrusions like the hemispherical protrusions according to Embodiments 1 and 2 and Reference but a series of protrusions of meandering shapes. In Embodiment 3, since the individual protrusions 33 constitute a series of meandering shapes, the enclosed spaces 34, too, constitute a series of meandering shapes. This allows the fluid filling the enclosed space 34 to freely flow back and forth through the series of enclosed spaces 34. Such flow of the fluid through the series of enclosed spaces 34 disperses and averages the pressure locally applied to the protrusions 33. For that reason, use of the tactile sensor 100d according to Embodiment 3 allows the plurality of protrusions 33 to, in a case where the robot hand has grasped the object 60, make contact with the surface of the object 60 at uniform pressure even when the surface shape of the object 60 has asperities. For example, in the case of a robot hand having a fingertip made of a hard material or a smooth-surfaced uniformly-flat fingertip, the grasping of the object 60 with a constant force causes a bulging portion of the surface shape of the object 60 to be pressed with a stronger force and causes a concave portion of the surface shape of the object 60 to be pressed with a weaker force. That is, such a robot hand lacks uniformity in grip pressure on the object 60. As noted above, a robot hand that can grasp the entire surface of the object 60 at uniform pressure regardless of the surface shape of the object 60 can be achieved by filling, with a fluid, the enclosed spaces 34 between the inside surfaces of the series of protrusions 33 of meandering shapes and the first sheet 31 according to Embodiment 3.

It should be noted that a method for manufacturing a tactile sensor 100d according to Embodiment 3 is identical to the method for manufacturing a tactile sensor 100a according to Embodiment 1 except for the shapes of molds that are used to mold the protrusions 33 in the protrusion forming step.

Although the foregoing has described a tactile sensor and a method for manufacturing the same according to the present disclosure with reference to embodiments, the present disclosure is not limited to these embodiments. Embodiments based on the application to the present embodiment of various modifications conceived of by persons skilled in the art and embodiments based on combinations of some constituent elements of the embodiments are encompassed in the scope of the present disclosure, provided such embodiments do not depart from the spirit of the present disclosure.

For example, a tactile sensor according to the present disclosure may detect the direction of a deformation of each of the plurality of protrusions on the basis of both changes in capacitance and changes in resistance.

Specifically, although, in Embodiment 1, a deformation of the plurality of protrusions 3 in one direction (which is the Y direction here) is sensed on the basis of changes in capacitance between the second electrode patterns 5a and 5b and the first electrode pattern 5c, changes in resistance of the second electrode patterns 5a and 5b and the first electrode pattern 5c may be measured in addition to changes in capacitance between the second electrode patterns 5a and 5b and the first electrode pattern 5c. This makes it possible to sense a deformation of the plurality of protrusions 3 on the basis of both changes in capacitance and changes in resistance.

Further, although, in Embodiment 1, a deformation of the plurality of protrusions 3 is sensed on the basis of changes in capacitance between the second electrode patterns 5a and 5b and the first electrode pattern 5c, a third electrode pattern that varies in resistance according to expansion and contraction may be further disposed on outside surfaces of the plurality of protrusions 3, i.e., surfaces of the plurality of protrusions 3 that make contact with an object. Further, the third electrode pattern may be disposed to extend in the same direction as the direction extension of the second electrode patterns or may be disposed to extend in a direction crossing the direction extension of the second electrode patterns in a plan view. This makes it possible to sense a deformation of the plurality of protrusions 3 not only in one direction but also in two different directions.

Further, in Embodiment 2, a deformation of the protrusions 13 in two different directions is sensed on the basis of changes in capacitance by disposing the second electrode patterns 15a and 15b and the first electrode patterns 15c and 15d to intersect each other in a plan view. In Embodiment 2, the direction of a deformation of the plurality of protrusions 13 may be sensed on the basis of changes in resistance in addition to changes in capacitance. For example, a resistance film pattern that varies in resistance according to expansion and contraction may be disposed between the second electrode patterns 15a and 15b or may be disposed between the first electrode patterns 15c and 15d. Furthermore, a third electrode pattern may be disposed on outside surfaces of the plurality of protrusions 13 to intersect the second electrode patterns in a plan view. This makes it possible to sense a deformation of the plurality of protrusions 13 on the basis of both changes in capacitance and changes in resistance.

Further, although, in Reference, a deformation of the plurality of protrusions 23 is sensed on the basis of changes in resistance of the second electrode patterns 25a and 25b and the third electrode patterns 25c and 25d according to expansion and contraction, a deformation of the plurality of protrusions 23 may be sensed on the basis of changes in capacitance in addition to changes in resistance. For example, in addition to the foregoing configuration, at least one first electrode pattern may be further provided, and changes in capacitance between the second electrode patterns 25a and 25b and the first electrode pattern may be measured. This makes it possible to sense a deformation of the plurality of protrusions 23 in two different directions on the basis of both changes in resistance and changes in capacitance.

Further, although, in Embodiment 3, a deformation of the plurality of protrusions 33 is sensed on the basis of changes in capacitance between the second electrode patterns 35a and 35b and the first electrode pattern 35c, which are disposed along the shapes of the protrusions 33 of meandering shapes, a deformation of the plurality of protrusions 33 may be further sensed on the basis of changes in resistance. For example, a third electrode pattern may be formed on outside surfaces of the plurality of protrusions 33 so as to transverse the meandering shapes. This makes it possible to sense a deformation of the plurality of protrusions 33 on the basis of both changes in capacitance and changes in resistance.

A tactile sensor according to the present disclosure can detect not only a pressing force but also a shearing stress or sliding friction on an object and is therefore applicable as a sensor that is attached to a robot hand of a service robot such as a nursing-care robot, an assist robot, or a pet robot.

What is claimed is:

1. A tactile sensor comprising:
a first sheet having at least either flexibility or elasticity; and
a second sheet having at least either flexibility or elasticity and having a first surface facing the first sheet and a second surface opposite to the first surface,
wherein the second surface includes a plurality of protruding shapes,
each of the plurality of protruding shapes has an enclosed space inside, the enclosed space being defined by the first surface of the second sheet and the first sheet,
at least one first electrode pattern is disposed on the first sheet in the enclosed space of each of the plurality of protruding shapes,
at least one second electrode pattern is disposed on the first surface in the enclosed space of each of the plurality of protruding shapes, and
in the enclosed space of each of the plurality of protruding shapes, the at least one first electrode pattern includes a plurality of first electrode patterns and/or the at least one second electrode pattern includes a plurality of second electrode patterns.

2. The tactile sensor according to claim 1, wherein the at least one second electrode pattern includes the plurality of second electrode patterns in the enclosed space of each of the plurality of protruding shapes, and
the plurality of second electrode patterns extend in parallel.

3. The tactile sensor according to claim 1, wherein the at least one first electrode pattern includes the plurality of first electrode patterns in the enclosed space of each of the plurality of protruding shapes, and
the plurality of first electrode patterns extend in parallel.

4. The tactile sensor according to claim 1, wherein a part of the first surface that surrounds each of the plurality of protruding shapes is bonded to the first sheet.

5. The tactile sensor according to claim 1, wherein in each enclosed space, the at least one second electrode pattern and the at least one first electrode pattern intersect each other in a plan view.

6. The tactile sensor according to claim 1, wherein the second sheet is constituted by an elastomer.

7. The tactile sensor according to claim 1, wherein the at least one first electrode pattern and the at least one second electrode pattern have elasticity.

8. The tactile sensor according to claim 1, wherein the at least one second electrode pattern in the enclosed space of each of the plurality of protruding shapes is electrically connected to the at least one second electrode pattern in another enclosed space.

9. The tactile sensor according to claim 1, wherein the at least one first electrode pattern in the enclosed space of each of the plurality of protruding shapes is electrically connected to the at least one first electrode pattern in another enclosed space.

10. The tactile sensor according to claim 1, wherein each enclosed space is filled with a fluid.

11. The tactile sensor according to claim 1, wherein each of the plurality of protruding shapes has a meandering shape in a plan view.

12. A method for manufacturing a tactile sensor comprising:
forming a plurality of first electrode patterns on a first sheet having at least either flexibility or elasticity;
forming a plurality of second electrode patterns on a first surface of a second sheet having at least either flexibility or elasticity and having the first surface and a second surface opposite to the first surface;
forming a plurality of protruding shapes on the second surface by forming a plurality of concave shapes on the first surface of the second sheet; and
placing the first and second sheets so as to form, inside each of the plurality of protruding shapes, an enclosed space defined by the first surface of the second sheet and the first sheet;
wherein at least one of the plurality of first electrode patterns is disposed in the enclosed space of each of the plurality of protruding shapes,
at least one of the plurality of second electrode patterns is disposed in the enclosed space of each of the plurality of protruding shapes, and
in the enclosed space of each of the plurality of protruding shapes, the at least one first electrode pattern includes a plurality of first electrode patterns and/or the at least one second electrode pattern includes a plurality of second electrode patterns.

13. The method according to claim 12, wherein the placing the first and second sheets includes bonding, to the first sheet, a part of the first surface that surrounds each of the plurality of protruding shapes.

14. A method of sensing with a tactile sensor,
the tactile sensor including
a first sheet having at least either flexibility or elasticity, and
a second sheet having at least either flexibility or elasticity and having a first surface facing the first sheet and a second surface opposite to the first surface,
wherein the second surface includes a plurality of protruding shapes,
each of the plurality of protruding shapes has an enclosed space inside, the enclosed space being defined by the first surface of the second sheet and the first sheet,
at least one first electrode pattern is disposed on the first sheet in the enclosed space of each of the plurality of protruding shapes,
at least one second electrode pattern is disposed on the first surface in the enclosed space of each of the plurality of protruding shapes, and
in the enclosed space of each of the plurality of protruding shapes, the at least one first electrode pattern includes a plurality of first electrode patterns and/or the at least one second electrode pattern includes a plurality of second electrode patterns,
the method comprising:
measuring a change in capacitance between the at least one second electrode pattern and the at least one first electrode pattern of the tactile sensor in the enclosed space of one or more of the plurality of protruding shapes; and
sensing a deformation of at least one of the plurality of protruding shapes on the basis of the change in capacitance.

* * * * *